(12) United States Patent
Kamiya et al.

(10) Patent No.: US 9,222,499 B2
(45) Date of Patent: Dec. 29, 2015

(54) ATTACHING STRUCTURE USING CLIPS

(75) Inventors: Haruhisa Kamiya, Anjo (JP); Toshio Iwahara, Okazaki (JP); Makoto Kato, Toyota (JP); Tetsuya Ogino, Toyota (JP); Hiroyuki Suzuki, Miyoshi (JP)

(73) Assignee: Daiwa Kasei Kogyo Kabushiki Kaisha, Aichi-Ken (JP)

( * ) Notice: Subject to any disclaimer, the term of this patent is extended or adjusted under 35 U.S.C. 154(b) by 190 days.

(21) Appl. No.: 13/600,636

(22) Filed: Aug. 31, 2012

(65) Prior Publication Data

US 2013/0058712 A1  Mar. 7, 2013

(30) Foreign Application Priority Data

Aug. 31, 2011  (JP) .................................. 2011-188921

(51) Int. Cl.
| | |
|---|---|
| *B60H 1/34* | (2006.01) |
| *F16B 9/02* | (2006.01) |
| *F16B 21/06* | (2006.01) |
| *B60H 1/00* | (2006.01) |
| *F16B 21/07* | (2006.01) |
| *F16B 21/09* | (2006.01) |

(52) U.S. Cl.
CPC .......... *F16B 21/065* (2013.01); *B60H 1/00521* (2013.01); *F16B 21/076* (2013.01); *B60H 2001/3492* (2013.01); *F16B 21/09* (2013.01); *Y10T 403/7075* (2015.01)

(58) Field of Classification Search
CPC .......... F16B 9/023; F16B 2/241; F16B 2/243; B60H 1/34
USPC ............. 403/329, 240; 285/202, 203; 180/90; 296/70; 454/152, 155
See application file for complete search history.

(56) References Cited

U.S. PATENT DOCUMENTS

| | | | | |
|---|---|---|---|---|
| 2,980,478 | A * | 4/1961 | Woehrle .......................... | 312/7.2 |
| 5,195,793 | A * | 3/1993 | Maki ................................ | 24/297 |
| 6,715,185 | B2 * | 4/2004 | Angellotti ........................ | 24/297 |
| 6,772,484 | B2 * | 8/2004 | Miyano et al. .................. | 24/458 |
| 7,527,553 | B2 * | 5/2009 | Steinbeiss ....................... | 454/155 |
| 7,904,994 | B2 * | 3/2011 | Girodo et al. ................... | 24/458 |
| 2004/0083583 | A1 * | 5/2004 | Bradley et al. .................. | 24/297 |
| 2008/0286067 | A1 * | 11/2008 | Swayne ......................... | 411/182 |

(Continued)

FOREIGN PATENT DOCUMENTS

| | | |
|---|---|---|
| JP | 54-118973 U | 8/1979 |
| JP | 1-171755 U | 12/1989 |
| JP | 4-71806 U | 6/1992 |
| JP | 2001-140820 | 5/2001 |

(Continued)

OTHER PUBLICATIONS

Office Action dated Dec. 2, 2014 for Japanese Application No. 2011-188921 ( 4 pages).

*Primary Examiner* — Michael P Ferguson
(74) *Attorney, Agent, or Firm* — Christensen Fonder PA (57) ABSTRACT

An attaching structure using a clip for attaching an article of a vehicle to a panel secured to a vehicle body in a condition in which an article body of the article is inserted into an opening formed in the panel, may include an engagement portion formed in the article body, and a retainer portion formed in the clip and capable of being connected to the article body via the engagement portion. The engagement portion and the retainer portion are arranged and constructed such that the retainer portion can overlap a periphery of the engagement portion when the retainer portion is connected to the article body via the engagement portion.

3 Claims, 8 Drawing Sheets

(56) References Cited

U.S. PATENT DOCUMENTS

2011/0035909 A1* 2/2011 Moberg ............... 24/289
2011/0113598 A1* 5/2011 Hofmann et al. ............... 24/458

FOREIGN PATENT DOCUMENTS

| | | |
|---|---|---|
| JP | 3664298 | 4/2005 |
| JP | 2005-145222 | 6/2005 |

* cited by examiner

ATTACHING STRUCTURE USING CLIPS

BACKGROUND OF THE INVENTION

1. Field of the Invention

The present invention relates to attaching structures using clips for attaching articles (e.g., air-conditioning registers) of a vehicle to object members (e.g. instrument panels) that are secured to a vehicle body.

2. Description of Related Art

An attaching structure using clips for attaching an air-conditioning register (an article) of a vehicle to an instrument panel (an object member) secured to a vehicle body is already known. Such an attaching structure is taught, for example, by Japanese Patent No. 3664298. In the attaching structure, the register has engagement holes that are formed in a retainer portion thereof. Each of the clips has a connecting portion and is connected to the retainer portion of the register by inserting the connecting portion into each of the engagement holes. In particular, each of the engagement holes of the retainer portion of the register may include a wide insertion portion and a narrowed securing portion that is continuous with the insertion portion. Further, the connecting portion of each of the clips is composed of a rib-shaped support wall and an engagement strip. The support wall is formed as a vertical wall that is projected from a lower surface of each of the clips. Conversely, the engagement strip is formed as a lateral strip that is laterally projected beyond the support wall.

In order to attach each of the clips to the retainer portion of the register, first, the engagement strip of the connecting portion of each of the clips is inserted into the insertion portion of each of the engagement holes formed in the retainer portion of the register from above. Thereafter, each of the clips is slid, so as to introduce the support wall of the connecting portion thereof into the securing portion of each of the engagement holes. As a result, the support wall of the connecting portion of each of the clips can be secured in the securing portion of each of the engagement holes while the engagement strip of the connecting portion engages an inner surface of the retainer portion of the register. Thus, the clips can be attached to the retainer portion of the register.

However, in the attaching structure, when the connecting portion of each of the clips is connected to the retainer portion of the register, a clearance can be formed between the connecting portion and a periphery of each of the engagement holes. Further, the insertion portion of each of the engagement holes can be loosely covered by the lower surface of each of the clips. Therefore, light and air can be leaked through the engagement holes formed in the retainer portion of the register. This may lead to inferior appearance of the register and to reduced air-conditioning performance of an air-conditioner. In addition, condensation caused by the leaked air can be formed in the instrument panel to which the register is attached.

Therefore, there is a need in the art for an improved attaching structure for attaching an article of a vehicle to an object member secured to a vehicle body.

BRIEF SUMMARY OF THE INVENTION

For example, in one aspect of the present invention, an attaching structure using a clip for attaching an article of a vehicle to a panel secured to a vehicle body in a condition in which an article body of the article is inserted into an opening formed in the panel, may include an engagement portion formed in the article body, and a retainer portion formed in the clip and capable of being connected to the article body via the engagement portion. The engagement portion and the retainer portion are arranged and constructed such that the retainer portion can overlap a periphery of the engagement portion when the retainer portion is connected to the article body via the engagement portion.

According to the attaching structure thus constructed, the retainer portion can reliably overlap the periphery of the engagement portion when the retainer portion is connected to the article body via the engagement portion. Thus, light and air can be prevented from being leaked through the engagement portion. Therefore, the attaching structure is suitable for attaching an air-conditioning register of the vehicle to an instrument panel of the vehicle body.

Optionally, the retainer portion of the clip may have an engagement strip. The engagement strip and the engagement portion may be arranged and constructed such that a lower surface of the engagement strip can be flush with an inner surface of the article body when the retainer portion is connected to the article body via the engagement portion.

Other objects, features and advantages of the present invention will be readily understood after reading the following detailed description together with the accompanying drawings and the claims.

DETAILED DESCRIPTION OF THE INVENTION

Detailed representative embodiments of the present invention are shown in FIGS. 1 to 19.

First Embodiment

In the following, a first embodiment of the present invention will be described in detail with reference to FIGS. 1 to 13. Further, in an attaching structure using clips for attaching an article to an object member, an air-conditioning register of a vehicle and an instrument panel secured to a vehicle body are respectively exemplified as the article and the object member.

Figure 1:
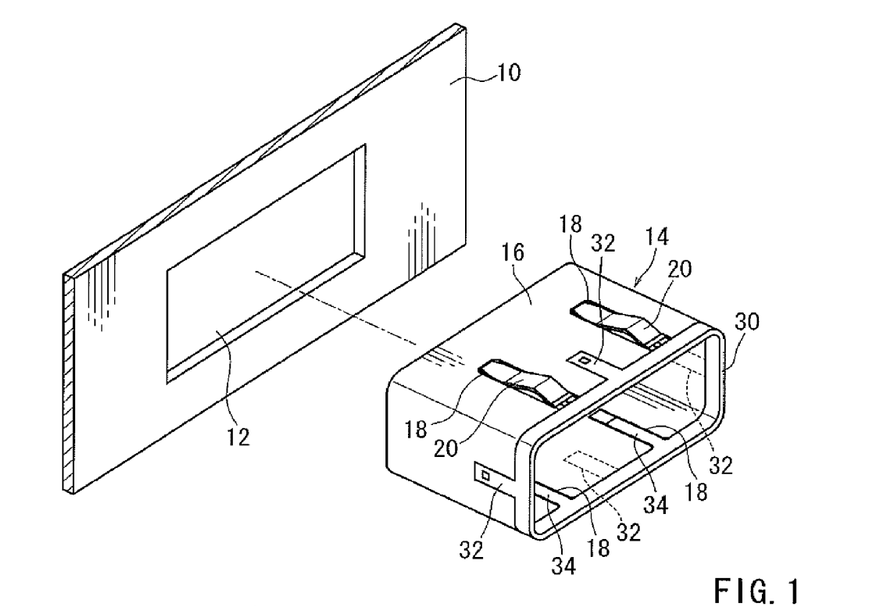
FIG. 1 is a perspective view of an air-conditioning register having a clip in a first embodiment of the present invention, which illustrates a condition in which the register is not attached to an instrument panel.

As shown in FIG. 1, the instrument panel 10 may have a rectangular opening 12 that is capable of receiving the register 14 therein. Upon insertion of the register 14 into the opening 12, the register 14 can be attached to the instrument panel 10.

As shown in FIG. 1, the register 14 may have a rectangular cylindrically-shaped register body 16 (an outer shell portion). Further, the register 14 may have controller fins (not shown) that are disposed in the register body 16. The controller fins may generally be positioned adjacent to an outer opening portion of the register body 16. The register 14 may have a plurality of (four in this embodiment) elongated engagement portions 18 that are formed in upper and lower walls of the register body 16. In particular, two of the (four) engagement portions 18 may be formed in the upper wall of the register body 16. Conversely, two of the (four) engagement portions 18 may be formed in the lower wall of the register body 16. The engagement portions 18 may preferably arranged so as to extend in a longitudinal or axial direction of the register body 16. Further, the engagement portions 18 may be used for attaching the clips 20 (which will be hereinafter described) to the register 14. Therefore, the number of the engagement portions 18 may be the same as the number of the clips 20. Further, the number of the engagement portions 18 (the number of the clips 20) is not limited to four. The register 14 may also have a rectangular bezel 30 that can be attached to an outer end periphery of the register body 16.

Figure 2:
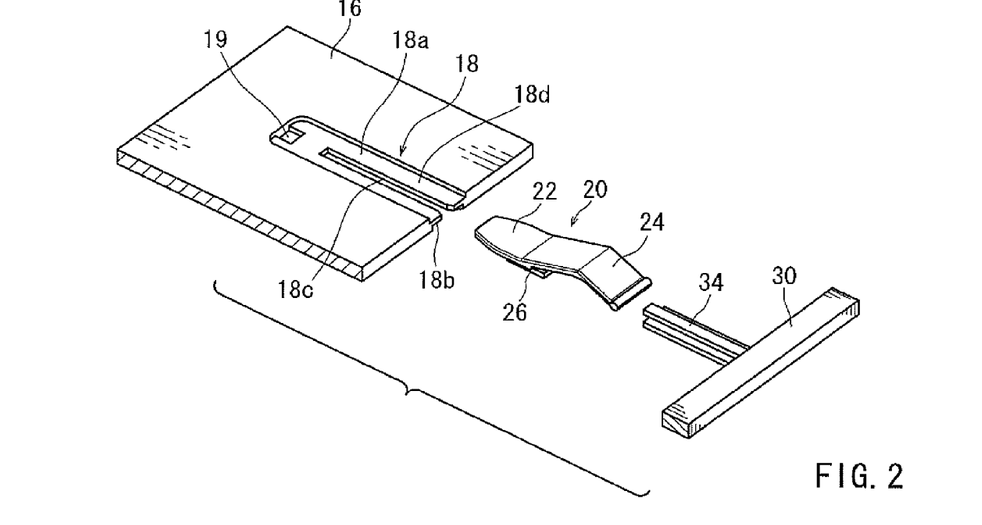
FIG. 2 is a partially perspective view of the register and the clip, which illustrates a condition in which the clip is not attached to the register.
Figure 9:
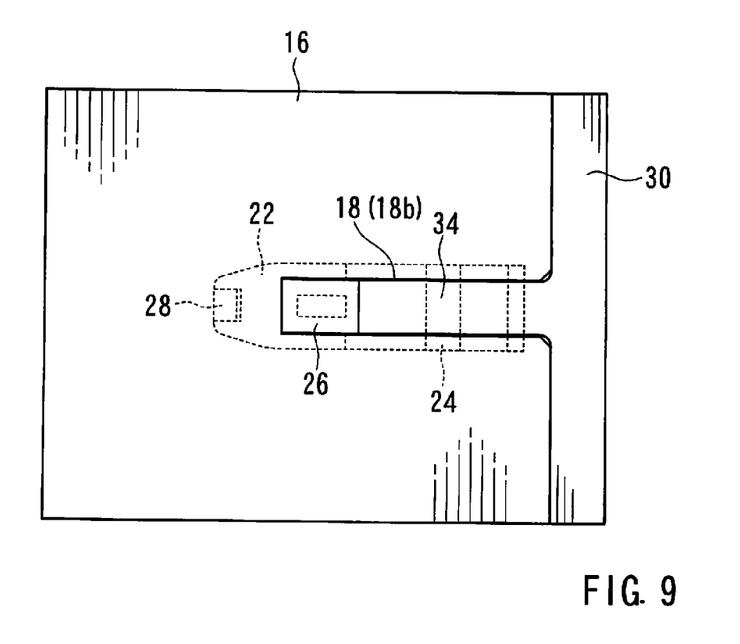
FIG. 9 is a bottom plan view of FIG. 7.
Figure 10:
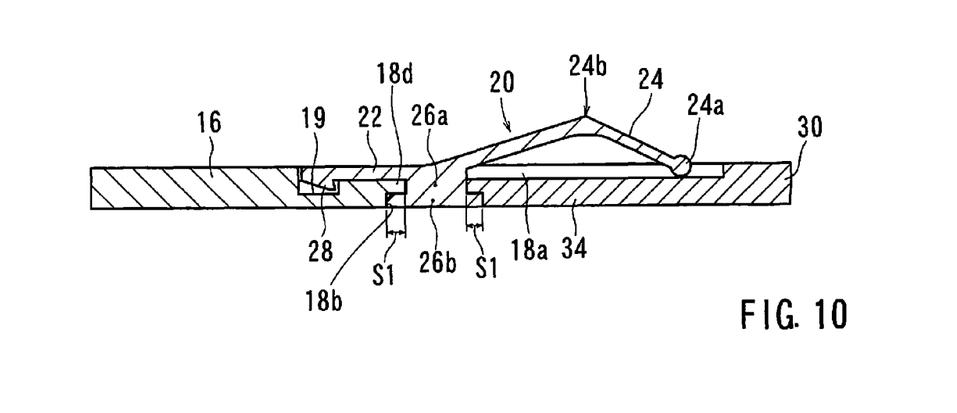
FIG. 10 is a cross-sectional view taken along line X-X in FIG. 7

As shown in FIG. 2, each of the engagement portions 18 may be formed in the register body 16, so as to longitudinally extend from the outer end periphery of the register body 16. That is, each of the engagement portions 18 may have an open end that is opened in the outer end periphery of the register body 16. Each of the engagement portions 18 may include an elongated open-ended outer recess 18a, an elongated open-ended inner recess 18b (a recessed portion), an elongated open-ended slot 18c and a locking recess 19. The outer recess 18a may be formed in an outer surface of the register body 16 and have a constant depth over the entire length thereof. The inner recess 18b may be formed in an inner surface of the register body 16 and have a constant depth over the entire length thereof. Further, as shown in FIG. 9, the inner recess 18b may be aligned with the outer recess 18a in a thickness direction of the register body 16. However, the inner recess 18b may have a shape and a size different from the outer recess 18a. In particular, the inner recess 18b may be shortened and narrowed relative to the outer recess 18a. Further, as shown in FIG. 2, each of the engagement portions 18 may include an elongated thinned wall portion 18d that is defined between the outer recess 18a and the inner recess 18b. The slot 18c may be formed in the thinned wall portion 18d, so as to extend therealong. The slot 18c may be positioned in a widthwise central portion of the thinned wall portion 18d. The locking recess 19 may be formed within the outer recess 18a, so as to be positioned adjacent to a closed end thereof (FIGS. 2 and 10).

Figure 3:
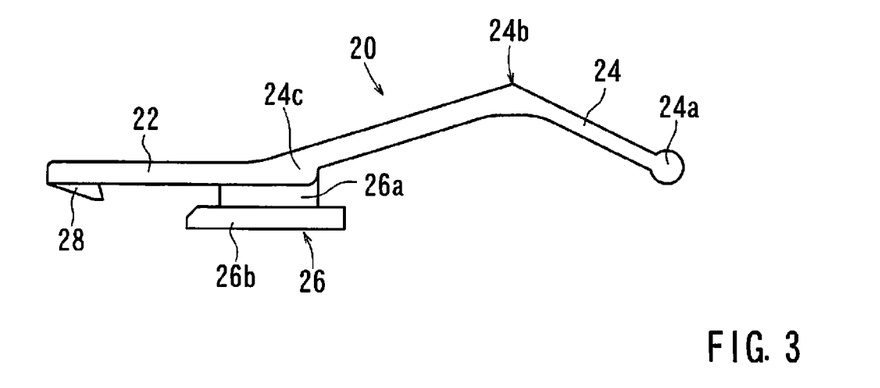
FIG. 3 is an elevational view of the clip.
Figure 4:
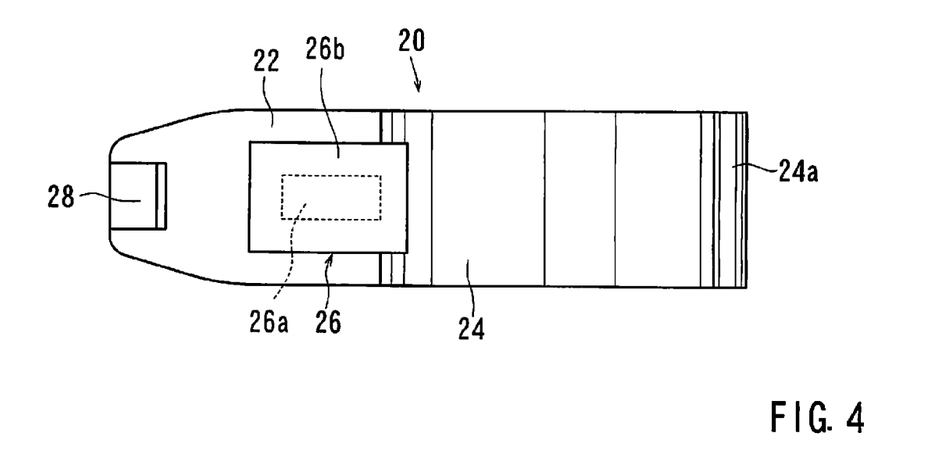
FIG. 4 is a bottom plan view of the clip.
Figure 5:
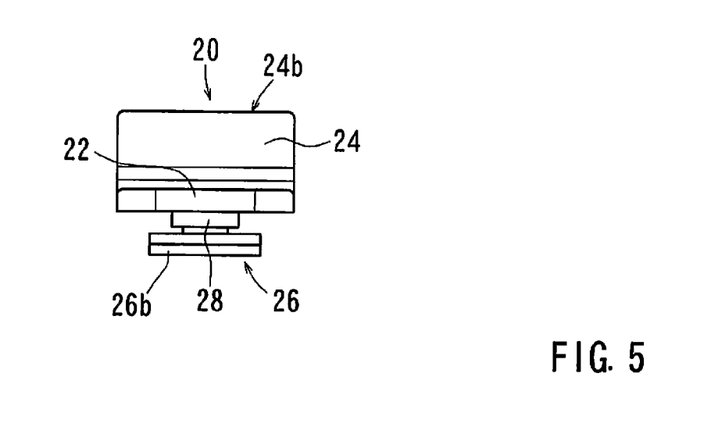
FIG. 5 is a side view of the clip.
Figure 6:
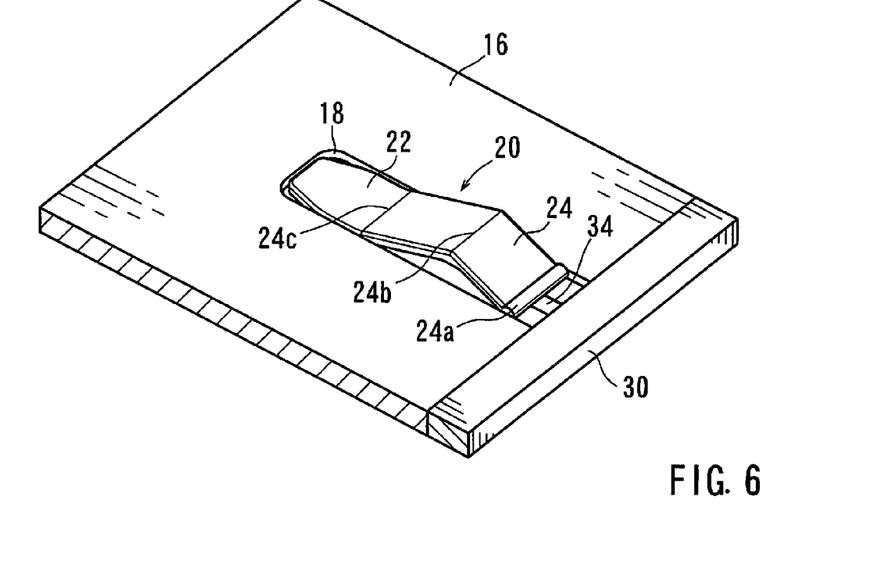
FIG. 6 is a partially perspective view of the register, which illustrates a condition in which the clip is attached to the register.
Figure 11:
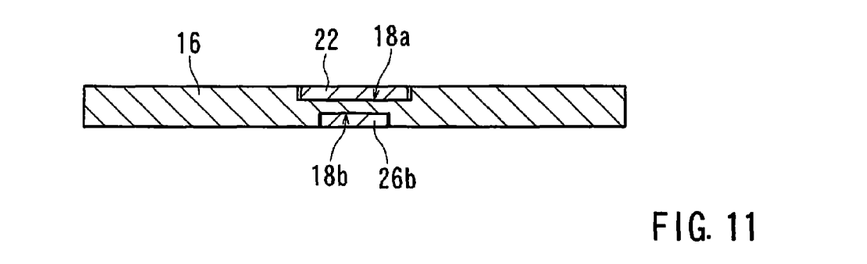
FIG. 11 is a cross-sectional view taken along line XI-XI in FIG. 8
Figure 12:
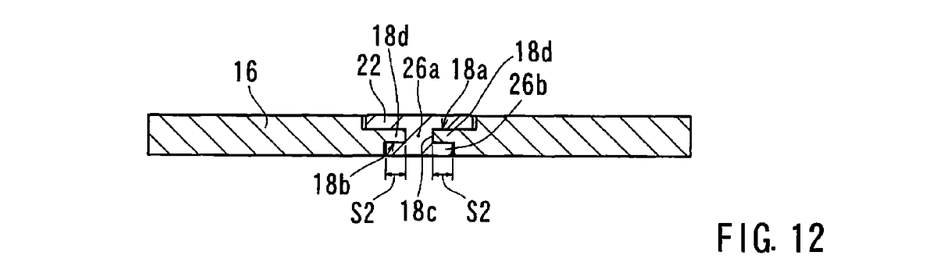
FIG. 12 is a cross-sectional view taken along line XII-XII in FIG. 8
Figure 13:
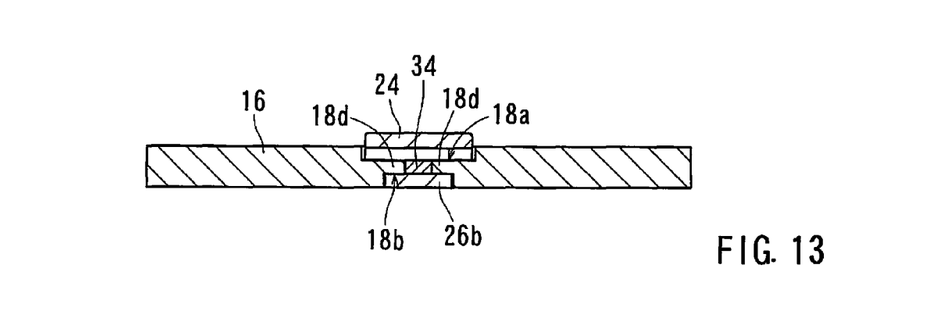
FIG. 13 is a cross-sectional view taken along line XIII-XIII in FIG. 8

The clips 20 may preferably be integrally formed by plastic molding. As shown in FIGS. 3 to 5, each of the clips 20 may have a flat plate-shaped base portion (a main body) 22 and an elastically deformable portion 24 integrated with the base portion 22. The base portion 22 may have a desired width that allows the same to be inserted into the outer recess 18a of each of the engagement portions 18. Therefore, the base portion 22 can be inserted into the outer recess 18a of each of the engagement portions 18 when each of the clips 20 is introduced into each of the engagement portions 18 from the open end thereof. Further, the base portion 22 may have the substantially same thickness as the thickness (depth) of the outer recess 18a of each of the engagement portions 18. Therefore, the base portion 22 can be positioned such that an upper surface thereof can be flush with the outer surface of the register body 16 when the base portion 22 is inserted into the outer recess 18a of each of the engagement portions 18 (FIGS. 10-12). Further, each of the clips 20 may have a retainer portion 26 and an engagement claw 28 that are respectively formed in a lower surface of the base portion 22.

Figure 7:
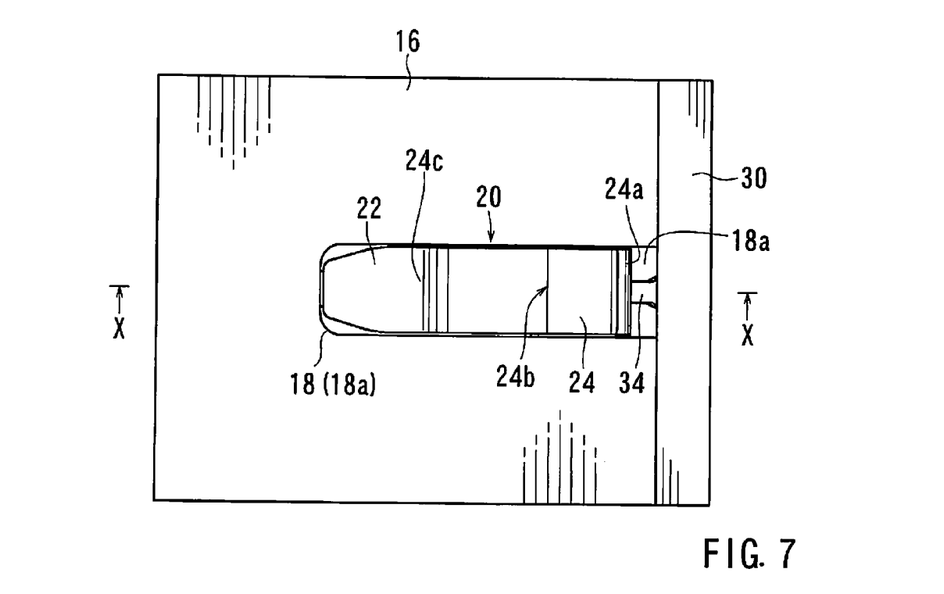
FIG. 7 is a plan view of FIG. 6.

As best shown in FIG. 3, the elastically deformable portion 24 may preferably be connected to a rear end portion of the base portion 22 and have an upwardly convexed V-shape in cross section. Therefore, as shown in, for example, FIG. 6, the elastically deformable portion 24 may have an apex or ridge line 24b that is formed in a substantially central portion in a longitudinal direction thereof. Further, as best shown in FIG. 7, the elastically deformable portion 24 may have a substantially constant width over the entire length thereof. The elastically deformable portion 24 thus formed can be elastically deformed or flexed about a proximal end portion 24c (a portion connected to the base portion 22) and a distal end portion 24a thereof. Further, the distal end portion 24a may have a rounded shape in cross section.

The retainer portion 26 of each of the clips 20 may be formed in a rearward end portion of the base portion 22. The retainer portion 26 of each of the clips 20 may be shaped to secure each of the clips 20 to the register body 16 in cooperation with the base portion 22 when each of the clips 20 is introduced into each of the engagement portions 18 from the open end thereof. In particular, as shown in FIGS. 3, 4 and 12, the retainer portion 26 may be composed of a narrow support strip 26a and an enlarged engagement strip 26b. The support strip 26a may be formed as a vertical wall that is projected downwardly from the lower surface of the base portion 22. Conversely, the engagement strip 26b is formed as a lateral wall that is connected to a lower end of the support strip 26a. Further, as best shown in FIG. 4, the engagement strip 26b may have a length and a width that are respectively greater than the length and the width of the support strip 26a. As shown in FIG. 12, the support strip 26a may have desired height and width so as to engage the slot 18c of each of the engagement portions 18. Conversely, the engagement strip 26b may have a desired width so as to be inserted into the inner recess 18b of each of the engagement portions 18. Further, the engagement strip 26b may have the substantially same thickness as the thickness (depth) of the inner recess 18b of each of the engagement portions 18. Therefore, the engagement strip 26b can be positioned such that a lower surface thereof can be flush with the inner surface of the register body 16 when the engagement strip 26b is inserted into the inner recess 18b of each of the engagement portions 18 (FIGS. 10-12).

The engagement claw 28 of each of the clips 20 may be formed in a forward end portion of the base portion 22. As shown in FIG. 10, the engagement claw 28 may be arranged and constructed to engage the locking recess 19 when each of the clips 20 is fully introduced into each of the engagement portions 18.

The rectangular bezel 30 may be arranged and constructed to be attached to the outer end periphery of the register body 16 in order to increase appearance of the register 14, which may be referred to as an "ornamental member." As shown in FIG. 1, the bezel 30 may have a rectangular ring shape corresponding to the outer end periphery of the register body 16. The bezel 30 may have a plurality of connecting strips 32 that can engage the register body 16 when the bezel 30 is attached to the outer end periphery of the register body 16. Further, as shown in FIG. 2, the bezel 30 may have a plurality of (four in this embodiment; one of which is shown FIG. 2) insertion strips 34 each of which can be introduced into each of the engagement portions 18 from the open end thereof. Each of the insertion strips 34 has the same cross-sectional shape as the retainer portion 26 (i.e., the support strip 26a and the engagement strip 26b) of each of the clips 20. Therefore, when the bezel 30 is attached to the outer end periphery of the register body 16, each of the insertion strips 34 can be inserted into the inner recess 18b and the slot 18c of each of the engagement portions 18. Further, each of the insertion strips 34 can be shaped such that a lower surface thereof can be flush with the inner surface of the register body 16 when the bezel 30 is attached to the register 16 (FIG. 10).

Next, a method of attaching the register 14 to the instrument panel 10 will now be described in detail.

First, each of the clips 20 is introduced into each of the engagement portions 18 formed in the register body 16 from the open end thereof. As a result, the base portion 22 of each of the clips 20 can be slidably inserted into the outer recess 18a of each of the engagement portions 18. Further, the support strip 26a and the engagement strip 26b of the retainer portion 26 can respectively be slidably inserted into the slot 18c and the inner recess 18b of each of the engagement portions 18. Each of the clips 20 is fully introduced into each of the engagement portions 18 until the engagement claw 28 engages the locking recess 19. Thus, the clips 20 can respectively be attached and secured to the register body 16 of the register 14.

Next, the bezel 30 is attached to the outer end periphery of the register body 16 while each of the insertion strips 34 of the bezel 30 is inserted into the inner recess 18b and the slot 18c of each of the engagement portions 18. The bezel 30 thus attached can be locked or secured to the register body 16 via the connecting strips 32. Upon attachment of the bezel 30 to the register body 16, each of the insertion strips 34 inserted into the slot 18c and the inner recess 18b can contact and press the support strip 26a and the engagement strip 26b of the retainer portion 26 positioned in the slot 18c and the inner recess 18b. Therefore, even if each of the clips 20 is not introduced into each of the engagement portions 18 until it reaches a predetermined position, each of the clips 20 can be reliably introduced into each of the engagement portions 18 until the engagement claw 28 engages the locking recess 19.

Thus, the register 14 having the clips 20 can be obtained. Thereafter, as shown in FIG. 1, the register 14 thus assembled is pressed into the opening 12 formed in the instrument panel 10. As a result, the register 14 (the register body 16) can be inserted into the opening 12 while the elastically deformable portion 24 of each of the clips 20 is elastically deformed by a periphery of the opening 12. Subsequently, when the register 14 is further pressed into the opening 12 until the ridge line 24b of the elastically deformable portion 24 passes through the periphery of the opening 12, the elastically deformable portion 24 can be elastically restored to engage the periphery of the opening 12. Thus, the register 14 can be attached to the instrument panel 10 via the clips 20.

Figure 8:
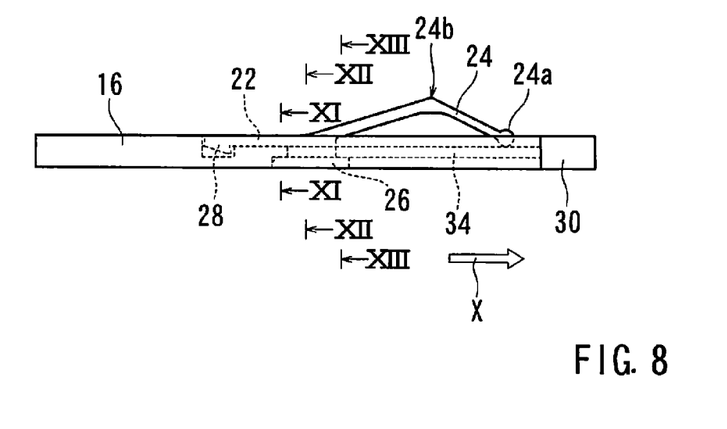
FIG. 8 is an elevational view of FIG. 7.

Further, as shown in FIGS. 8 to 10, when the elastically deformable portion 24 of each of the clips 20 is elastically deformed by the periphery of the opening 12, the distal end portion 24a thereof can smoothly slide along a bottom surface of the outer recess 18a of each of the engagement portions 18 and an upper surface of each of the insertion strips 34 of the bezel 30 because the distal end portion 24a has the rounded shape in cross section. Therefore, the elastically deformable portion 24 of each of the clips 20 can be smoothly deformed.

As previously described, in a condition in which the clips 20 are respectively attached to the register body 16 of the register 14 and in which the bezel 30 is attached to the register body 16, the base portion 22 of each of the clips 20 can be disposed within the outer recess 18a of each of the engagement portions 18. Further, the support strip 26a and the engagement strip 26b of the retainer portion 26 of each of the clips 20 can respectively be disposed within the slot 18c and the inner recess 18b of each of the engagement portions 18. Also, each of the insertion strips 34 of the bezel 30 can be disposed within the slot 18c and the inner recess 18b of each of the engagement portions 18. At this time, the engagement strip 26b of the retainer portion 26 can overlap the thinned wall portion 18d that is defined between the outer recess 18a and the inner recess 18b, so as to form front and rear overlap regions S1 (FIG. 10) and right and left overlap regions S2 (FIG. 12). That is, the retainer portion 26 of each of the clips 20 can engage or overlap a periphery of each of the engagement portions 18 in crank-shape in cross section. As a result, light and air can be prevented from being leaked through each of the engagement portions 18.

Further, the base portion 22 of each of the clips 20 can be positioned such that the upper surface thereof can be flush with the outer surface of the register body 16. Conversely, the engagement strip 26b of the retainer portion 26 of each of the clips 20 can be positioned such that the lower surface thereof can be flush with the inner surface of the register body 16. Further, each of the insertion strips 34 can be positioned such that the lower surface thereof can be flush with the inner surface of the register body 16. That is, the inner surface of the register body 16 can be flattened. As a result, as shown by an outline arrow X in FIG. 8, air can smoothly flow within the register 14. Further, the base portion 22 of each of the clips 20 can be changed such that the upper surface thereof can be slightly projected from the outer surface of the register body 16, if required.

Second Embodiment

The second detailed representative embodiment will now be described in detail with reference to FIGS. 14 to 19.

Because the second embodiment relates to the first embodiment, only the constructions and elements that are different from the first embodiment will be explained in detail. Elements that are the same in the first and second embodiments will be identified by the same reference numerals and a detailed description of such elements may be omitted.

Figure 14:
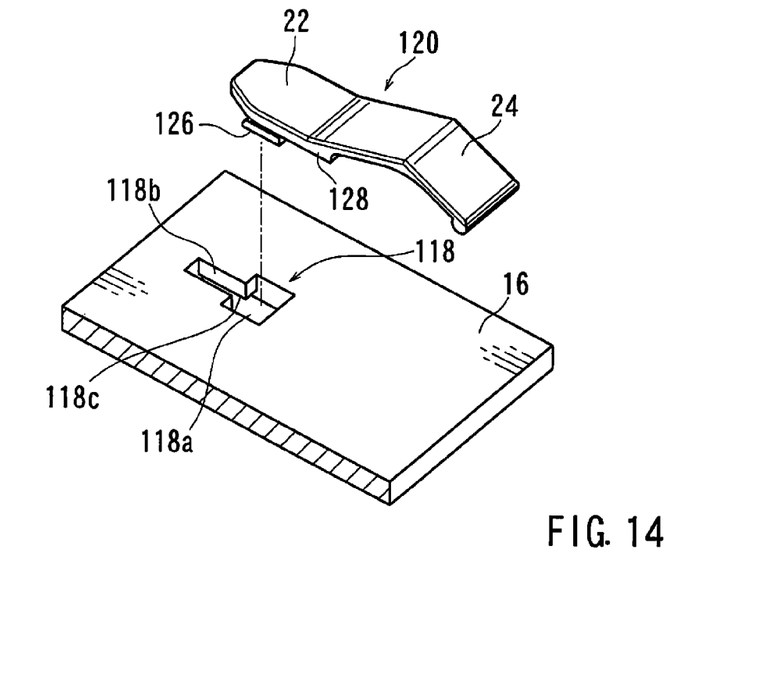
FIG. 14 is a partially perspective view of an air-conditioning register and a clip in a second embodiment of the present invention, which illustrates a condition in which the clip is not attached to the register.
Figure 18:
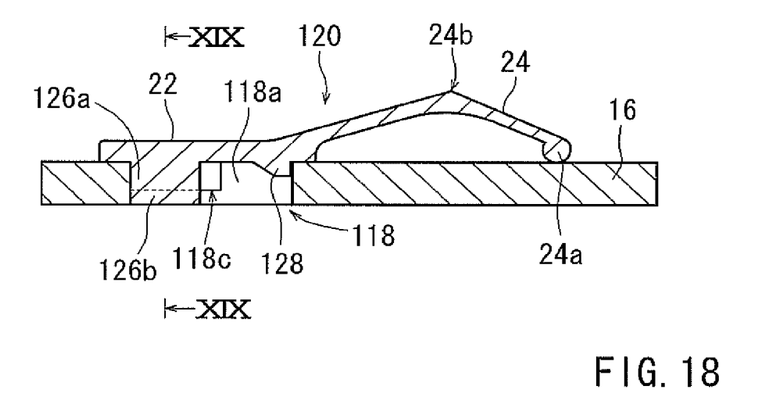
FIG. 18 is a cross-sectional view taken along line in FIG. 17.

As shown in FIG. 14, the register 14 may have a plurality of (one of which is shown) engagement portions 118. The engagement portions 118 may be formed as elongated through holes that are formed in upper and lower walls of the register body 16. Further, unlike the engagement portions 18, each of the engagement portions 118 may not be opened in the outer end periphery of the register body 16. Each of the engagement portions 118 may include a wide rectangular slot 118a and a narrow elongated slot 118b. Further, as shown in FIG. 18, the narrow slot 118b may have a shouldered portion 118c (a recessed portion) that is formed by partially removing the inner surface of the register body.

Figure 15:
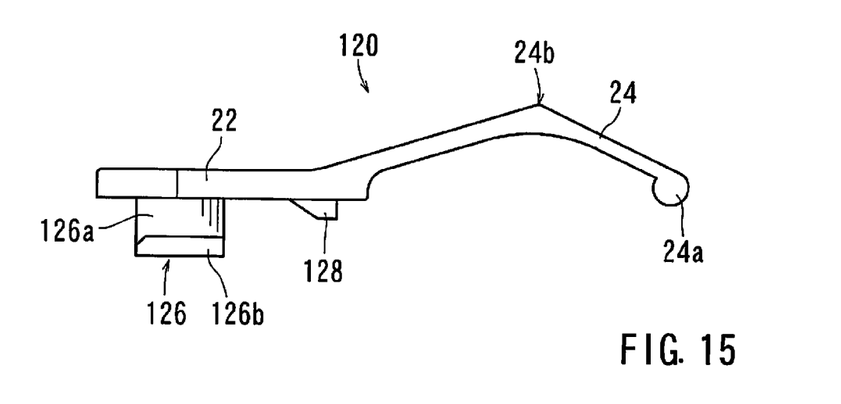
FIG. 15 is an elevational view of the clip.
Figure 16:
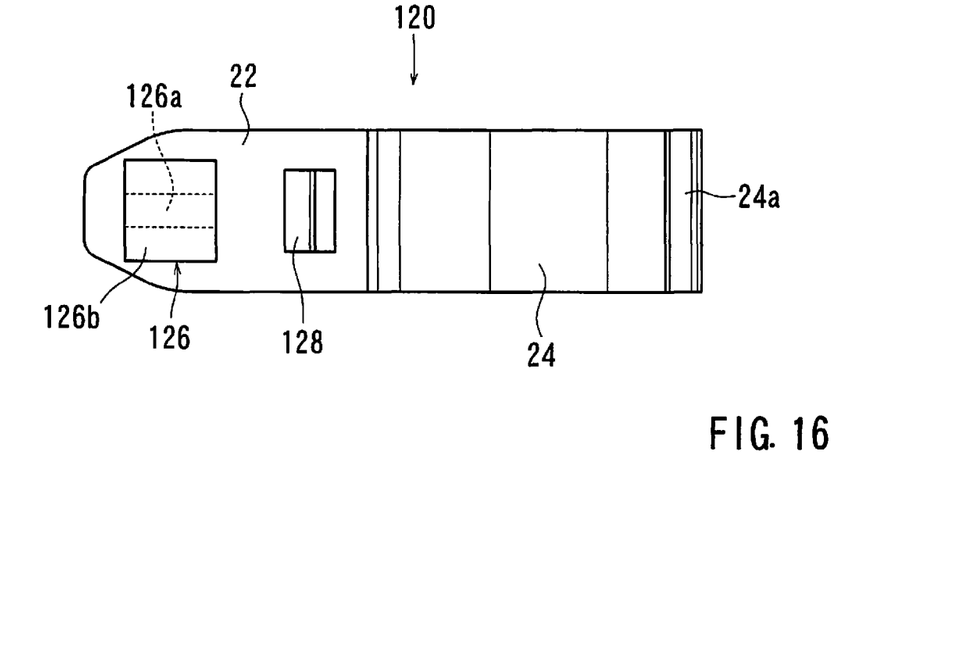
FIG. 16 is a bottom plan view of the clip.
Figure 17:
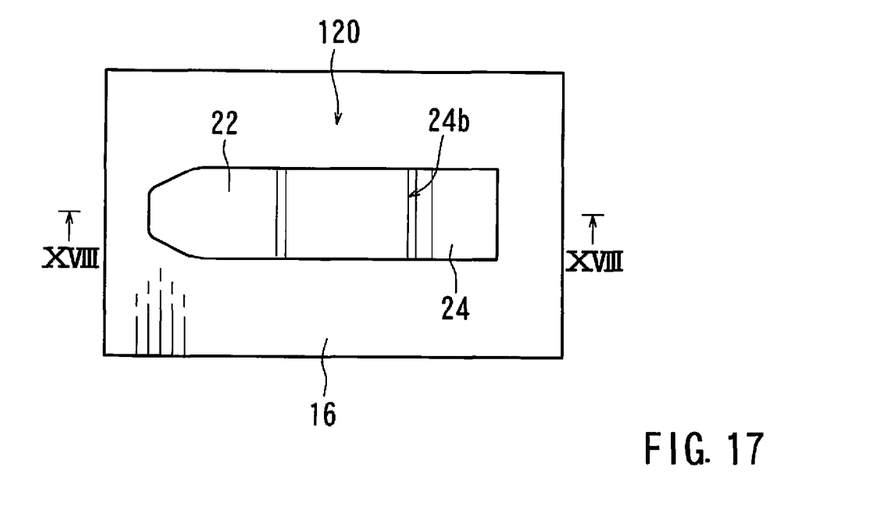
FIG. 17 is a partial plan view of the register, which illustrates a condition in which the clip is attached to the register.
Figure 19:
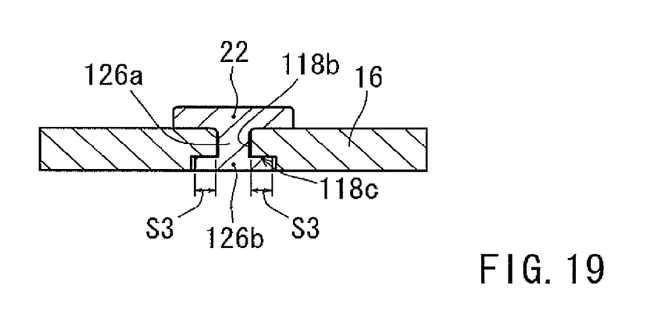
FIG. 19 is a cross-sectional view taken along line XIX-XIX in FIG. 18.

Similar to the clips 20 of the first embodiment, clips 120 may preferably be integrally formed by plastic molding. Each of the clips 120 may have a retainer portion 126 and an engagement claw 128 that are respectively formed in a lower surface of the base portion 22 of each of the clips 120. Unlike the retainer portion 26 of the first embodiment, the retainer portion 126 may be formed in a forward end portion of the base portion 22. In particular, as shown in FIGS. 15 and 16, the retainer portion 126 may be composed of a narrow support strip 126a and a widened engagement strip 126b. The support strip 126a may be formed as a vertical wall that is projected downwardly from the lower surface of the base portion 22. Conversely, the engagement strip 126b is formed as a lateral wall that is connected to a lower end of the support strip 126a. Further, as best shown in FIG. 16, unlike the retainer portion 26b of the first embodiment, the engagement strip 126b may have the same length as the support strip 126a. As shown in FIG. 19, the support strip 126a may have desired height and width so as to engage the narrow slot 118b of each of the engagement portions 118. Conversely, the engagement strip 126b may have desired length and width so as to be inserted into the wide slot 118a of each of the engagement portions 118. Further, the engagement strip 126b may have the substantially same thickness as the thickness (depth) of the shouldered portion 118c of each of the engagement portions 118.

Further, unlike the engagement claw 28 of the first embodiment, the engagement claw 128 of each of the clips 120 may be formed in a rearward end portion of the base portion 22. As shown in FIG. 18, unlike the engagement claw 28 of the first embodiment, the engagement claw 128 may be arranged and constructed to engage a rear end periphery of the wide slot 118a when each of the clips 120 is attached to the register 14.

As shown in FIG. 14, in order to attach the clips 120 to the register body 16 of the register 14, each of the clips 120 is introduced into the wide slot 118a of each of the engagement portions 118 from above. Thereafter, each of the clips 120 is slid forwardly, so as to move the retainer portion 126 forwardly. As a result, the support strip 126a and the engagement strip 126b of the retainer portion 126 can respectively be inserted into the narrow slot 118b and the shouldered portion 118c of each of the engagement portions 118. At this time, the base portion 22 of each of the clips 120 can be positioned on the outer surface of the register body 16. Thus, the clips 120 can respectively be attached to the register body 16.

In this condition, as shown in FIG. 18, the engagement claw 128 engages the rear end periphery of the wide slot 118a, so that each of the clips 120 can be prevented from being slid or moved rearwardly. Thus, the clips 120 can respectively be secured to the register body 16.

In a condition in which the clips 120 are respectively attached to the register body 16 of the register 14, each of the engagement portions 118 can be closed by the base portion 22 of each of the clips 120 from above. Further, the support strip 126a and the engagement strip 126b of the retainer portion 126 of each of the clips 120 can respectively be disposed within the narrow slot 118b and the shouldered portion 118c of each of the engagement portions 118. At this time, the engagement strip 126b of the retainer portion 126 can overlap the shouldered portion 118c, so as to form right and left overlap regions S3 (FIG. 19). That is, the retainer portion 126 of each of the clips 20 can engage or overlap a periphery of each of the engagement portions 118 in crank-shape in cross section. As a result, light and air can be prevented from being leaked through each of the engagement portions 118.

Further, as shown in FIGS. 18 and 19, the engagement strip 126b of the retainer portion 126 can be positioned within the shouldered portion 118c such that the lower surface thereof can be flush with the inner surface of the register body 16. As a result, air can smoothly flow within the register 14.

Naturally, various changes and modifications may be made to the present invention without departing from the scope of the invention. For example, in the first embodiment, the clips 20 are separated from the insertion strips 34 of the bezel 30. However, the clips 20 can be formed so as to be integrated with the insertion strips 34 of the bezel 30. According to this structure, the clips 20 can be attached to the register body 16 of the register 14 when the bezel 30 is attached to the register body 16.

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detailed description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. An attaching structure using a clip for attaching a vehicle air conditioning register to an instrument panel secured to a vehicle body, the attaching structure comprising:

an air-conditioning register comprising a cylindrical register body having an outer end periphery disposed at a longitudinal end thereof, the register body being longitudinally insertable within an opening in the panel;

a longitudinally-extending engagement portion formed in a peripheral wall of the register body and comprising an elongated rectangular slot having a constant width over the entire length thereof extending between inner and outer surfaces of the register body and an open end disposed within the outer end periphery, the engagement portion having a recessed portion extending along the slot on the inner surface of the register body;

a clip comprising a base portion and a retainer portion integrally-formed on a lower surface of the base portion, the retainer portion comprising a support strip having a rectangular shape in cross-section and an engagement strip at a distal end thereof, wherein the support strip and the engagement strip of the clip are configured to be longitudinally inserted into the slot and the recessed portion, respectively, from the open end of the engagement portion;

an integrally-formed elastically deformable portion extending from an upper surface of the base portion for engaging the panel when the register body is inserted within the opening; and a bezel comprising a ring-shaped bezel body attached to and annularly-extending along the outer end periphery of the register body, the bezel having an insertion strip axially-extending from the bezel body, wherein the insertion strip of the bezel is configured to be longitudinally inserted into the slot and the recessed portion from the open end of the engagement portion to contact the retainer portion of the clip when the bezel body engages the outer end periphery of the register body.

2. The attaching structure as defined in claim 1, wherein a lower surface of the engagement strip is flush with the inner surface of the register body when inserted within the recessed portion.

3. The attaching structure as defined in claim 1, wherein a lower surface of the insertion strip is flush with the inner surface of the register body when inserted within the recessed portion.

* * * * *